July 13, 1954 W. R. WEEKS 2,683,593
BOWL DRIVE FOR FOOD MIXERS
Filed Nov. 23, 1951

Inventor:
Walter R. Weeks,
by William C. Edwards, Jr.
His Attorney.

Patented July 13, 1954

2,683,593

UNITED STATES PATENT OFFICE 2,683,593

BOWL DRIVE FOR FOOD MIXERS

Walter R. Weeks, Hamden, Conn., assignor to General Electric Company, a corporation of New York Application November 23, 1951, Serial No. 257,707

7 Claims. (Cl. 259—84)

The present invention relates to food mixers and has to do particularly with an improved construction and arrangement for effecting rotation of a mixing bowl being used in connection with the food mixer.

According to my invention I provide one or more of the beaters with one or more driving protuberances on their bottoms and I then mount the rotatable bowl pan of the mixer in a manner such that it can be elevated to bring the bottom of a bowl positioned on it up into engagement with the protuberances to effect driving of the bowl.

For a consideration of what I believe to be novel and my invention, attention is directed to the following specification and to the claims appended thereto.

Figure 1:
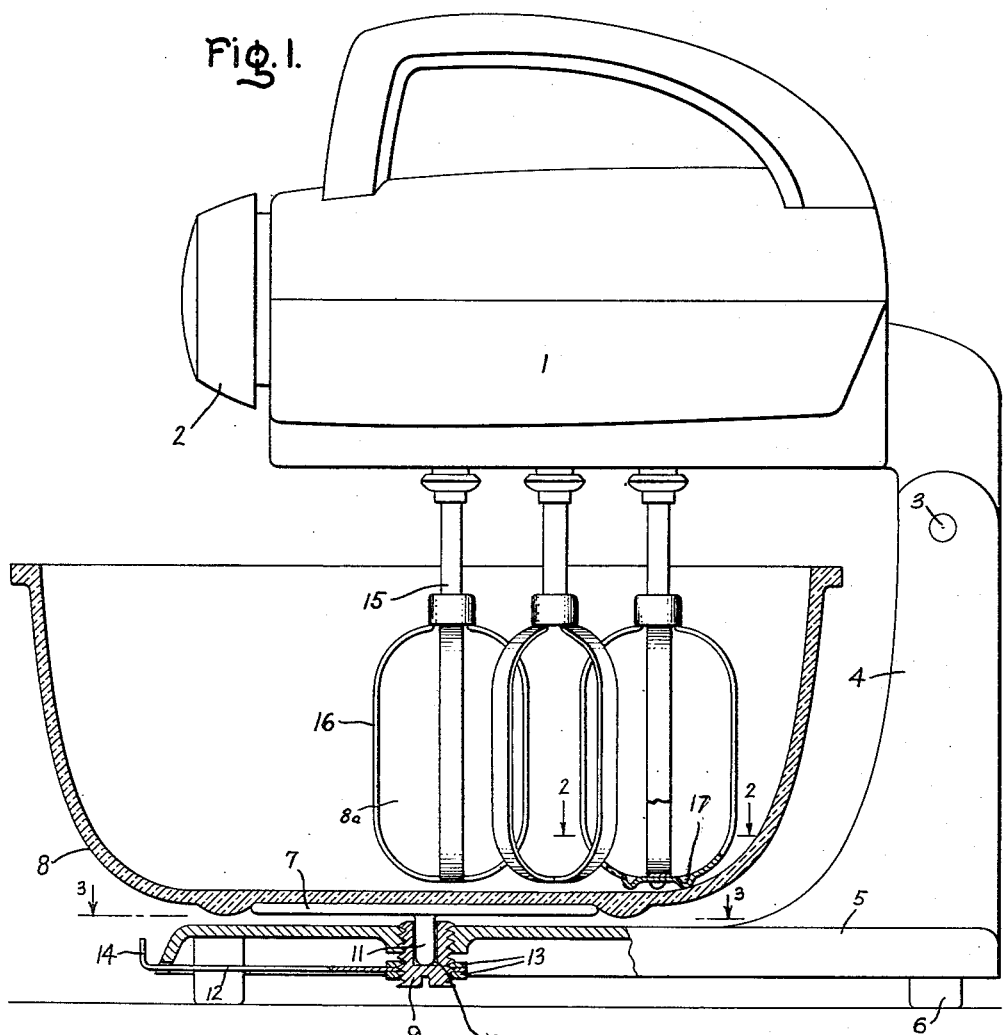
Figure 3:
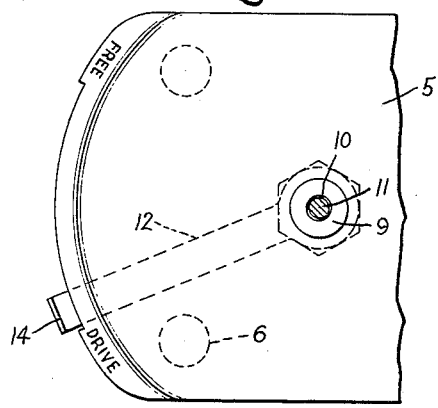
Figure 2:
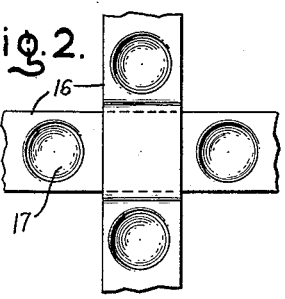

In the drawing, Fig. 1 is a side view, partly in section and partly broken away of a food mixer embodying the invention; Fig. 2 is a detail sectional view on an enlarged scale taken on line 2—2, Fig. 1, and Fig. 3 is a sectional view taken on line 3—3, Fig. 1.

Referring to the drawing, 1 indicates the eletric motor driven power unit of the mixer, the control knob being indicated at 2. It is pivotally mounted at 3 on a post or arm 4 which in turn is supported by a base 5 having feet 6 on which it rests. The base is positioned under the power unit as shown in Fig. 1 and is provided with a bowl pan 7 adapted to support a mixing bowl 8. Projecting downwardly from the power unit and suitably detachably connected with it to be driven thereby are a plurality of beaters 8a, three being shown in the present instance.

The structure so far described is a known one. It is shown by way of example and is to be taken as typical of any suitable food mixer structure.

My invention has to do with an improved arrangement for effecting rotation of the bowl pan with a bowl thereon through the intermediary of the beaters.

According to the embodiment of my invention which I have illustrated, I provide a vertically adjustable pivot stud 9 in base 5 provided with a socket 10 and I provide bowl pan 7 with a pivot pin 11 positioned in the socket and adapted to turn therein. The pin is at the center of pan 7 and has a rounded lower end which rests on the bottom of the socket and turns on it as a bearing. The pin forms the sole support for pan 7. For vertically adjusting the stud in base 5 I provide preferably a threaded connection of relatively high or steep pitch between the stud and base as shown clearly in Fig. 1 and for turning the stud I provide a lever 12 which at its inner end is fixed to the lower end of the stud by suitable means such as the lock nuts 13. The other end of lever 12 projects beyond the confines of base 5 and is provided with an upturned end 14 to form a handle. By moving lever 12, stud 9 may be turned relatively to base 5 to vertically adjust it. The handle may have an arc of movement as indicated in Fig. 3 by the markings "Free" and "Drive." The lock nuts 13 may be used for initial factory adjustment of pivot stud 9 with respect to base 5.

The beaters 8a comprise stems 15 and beater loops 16 and on the bottoms of the loops of one or more of the beaters there are provided downwardly projecting protuberances 17 having nicely rounded bottoms. The beaters shown each have two beater loops 16 formed from flat strip stock arranged at right angles to each other and there are four protuberances 17 spaced as shown in Fig. 2. In the drawing only the right hand beater, the one nearest the edge of the bowl, is provided with protuberances 17 this being the beater which is primarily effective in driving the bowl, being farthest from the center. However, all three beaters may be provided with protuberances thus making the beaters interchangeable.

In Fig. 1 the bowl pan is shown as having been elevated to bring the bottom of bowl 8 up into driving engagement with protuberances 17 so that when the beaters rotate the protuberances will cause the bowl and bowl pan to rotate, pivot pin 11 turning in socket 10. In the drawing the bowl bottom is shown as curving upwardly somewhat at the side so that at any instant only the outermost protuberance 17 is in driving engagement with the bowl bottom.

In normal use the bowl pan will be in lowered position, lever 12 being in the position marked "Free." The bowl with the material therein is placed on the bowl pan after which the power unit (which has been tilted back on its pivot, as is well understood, to permit of placing the bowl on the pan), is tilted forward to bring the beaters down into the bowl. Then either before or after the motor is started to run the beaters, lever 12 is turned to raise the bowl pan to bring the bottom of the bowl into driving engagement with the protuberances. The threads on stud 9 have a pitch or slope of a value to effect the desired amount of vertical adjustment of the stud when the lever 12 is turned from its one extreme position to the other.

The construction has the advantages that it is simple in structure, that the parts of the drive which come in contact with the materials being mixed, i. e. the protuberances, are easily cleaned, and that the drive adapts itself readily to differences in bowl wall thicknesses since the bowl can be elevated just enough to bring its bottom into engagement with the protuberances.

What I claim as new and desire to secure by Letters Patent of the United States is:

1. In an electric food mixer, a base, a bowl pan, means including a member carried by the base and vertically adjustable with respect thereto on which the bowl pan is rotatably mounted, a power unit on the base, rotatable beaters carried and driven by the power unit which project down toward the base, at least one of said beaters having a downwardly directed protuberance on its bottom, and manual means connected to said member and projecting to a position beyond the base for adjusting said member vertically with respect to the base while said beaters are rotating to move said bowl pan between a first position in which a bowl positioned on said bowl pan is brought into engagement with said protuberance to cause said beater to rotate the bowl and bowl pan and a second position in which the bowl is positioned out of engagement with said protuberance.

2. In an electric food mixer, a base, a stud having an upwardly facing socket, means supporting the stud in the base for vertical adjustment with respect to the base, a bowl pan having a pivot pin positioned in said socket for rotatably mounting the bowl pan on the base, a power unit carried by the base, rotatable beaters carried and driven by the power unit which project down toward the base, at least one of said beaters having a downwardly projecting protuberance on its bottom, and manual means connected to said stud and projecting to a position beyond the base for adjusting said stud vertically with respect to the base while said beaters are rotating to move said bowl pan between a first position in which a bowl positioned on said bowl pan is brought into engagement with said protuberance to cause said beater to rotate the bowl and bowl pan and a second position in which the bowl is positioned out of engagement with said protuberance.

3. In an electric food mixer, a base, a stud having an upwardly facing socket, means supporting the stud in the base for vertical adjustment with respect to the base, a bowl pan having a pivot pin positioned in said socket for rotatably mounting the bowl pan on the base, a power unit carried by the base, rotatable beaters carried and driven by the power unit which project down toward the base, at least one of said beaters having a plurality of spaced apart downwardly projecting protuberances on its bottom, and manual means connected to said stud and projecting to a position outside the base for adjusting said stud vertically with respect to the base while said beaters are rotating to move said bowl pan between a first position in which a bowl positioned on said bowl pan is brought into engagement with said protuberance to cause said beater to rotate the bowl and bowl pan and a second position in which the bowl is positioned out of engagement with said protuberance.

4. In an electric food mixer, a base having a threaded opening, a stud threaded into said opening having an upwardly facing socket, a bowl pan having a pivot pin positioned in said socket for rotatably mounting the pan on the base, a power unit carried by the base, rotatable beaters carried and driven by the power unit which project down toward the base, downwardly projecting protuberance means on the bottom of at least one of said beaters, and a lever connected to said stud for turning it to effect upward adjustment of the stud with respect to the base while said beaters are rotating to move said bowl pan between a first position in which a bowl positioned on said bowl pan is brought into engagement with said protuberance to cause said beater to rotate the bowl and bowl pan and a second position in which the bowl is positioned out of engagement with said protuberance.

5. In an electric food mixer, a base, a bowl pan, means including a member carried by the base and vertically adjustable with respect thereto on which the bowl pan is rotatably mounted, a power unit on the base, rotatable beaters carried and driven by the power unit which project down toward the base, said beaters comprising loops formed from flat strips which cross at their lower ends, the bottoms of the strips of at least one beater being formed to provide downwardly projecting protuberance means, and manual means connected to said member and projecting to a position beyond said base for adjusting said member vertically with respect to the base while said beaters are rotating to move said bowl pan between a first position in which a bowl positioned on said bowl pan is brought into engagement with said protuberance to cause said beater to rotate the bowl and bowl pan and a second position in which the bowl is positioned out of engagement with said protuberance.

6. In an electric food mixer, a base, a bowl pan, a bowl adapted to be supported on said bowl pan and having a bottom curved upwardly adjacent the side wall of the bowl, means including a member carried by the base and vertically adjustable with respect thereto on which the bowl pan is rotatably mounted, a power unit on the base, rotatable beaters carried and driven by the power unit which project down toward the base, at least one of said beaters havig at least one downwardly projecting protuberance on its bottom, said protuberance being displaced laterally from the axis of rotation of said beater, and manual means connected to said member and projecting to a position beyond the base for adjusting said member vertically with respect to the base while said beaters are rotating to move said member between the first position in which said protuberance in its outermost position engages the upwardly curving portion of the bottom of the bowl to cause said beater to rotate the bowl and bowl pan and a second position in which the bowl is positioned out of engagement with said protuberance.

7. In an electric food mixer, a base, a bowl pan, a bowl adapted to be supported on said bowl pan and having a bottom curved upwardly adjacent the side wall of the bowl, means including a member carried by the base and vertically adjustable with respect thereto on which the bowl pan is rotatably mounted, a power unit on the base, rotatable beaters carried and driven by the power unit which project down toward the base, at least one of said beaters having a plurality of spaced downwardly projecting protuberances on its bottom, said protuberances being displaced laterally from the axis of rotation of said beater, and manual means connected to said member and projecting to a position beyond the base for adjusting said member vertically with respect to the base while said beaters are rotating to move said member between the first position in which each of said protuberances in its outermost position successively engages the upwardly curving portion of the bottom of the bowl to cause said beater to rotate the bowl and bowl pan and a second position in which the bowl is positioned out of engagement with said protuberances.

References Cited in the file of this patent

UNITED STATES PATENTS

| Number | Name | Date |
|---|---|---|
| 2,038,256 | Wright | Apr. 21, 1936 |
| 2,069,506 | Ross | Feb. 2, 1937 |
| 2,192,843 | Bean | Mar. 5, 1940 |
| 2,285,816 | Jordan | June 9, 1942 |